US011457343B2

(12) United States Patent
Karpoor et al.

(10) Patent No.: US 11,457,343 B2
(45) Date of Patent: Sep. 27, 2022

(54) DEVICE, METHOD AND SYSTEM FOR CONTROLLING PROVISIONING OF A MOBILE DEVICE

(71) Applicant: MOTOROLA SOLUTIONS, INC., Chicago, IL (US)

(72) Inventors: Sanjaykumar S. Karpoor, Chicago, IL (US); Stephen C. Glass, Chicago, IL (US); Daniel P. Zetzl, Chicago, IL (US); Lorenzo J. Cruger, Chicago, IL (US); Blake C. Moselle, Chicago, IL (US); Roland Simandiev, Airport City (IL); John Touvannas, Chicago, IL (US); Xuejiao Liu, Chicago, IL (US); Yuval Namir, Airport City (IL); Erin B. Bryant, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 102 days.

(21) Appl. No.: 17/118,704

(22) Filed: Dec. 11, 2020

(65) Prior Publication Data
US 2022/0191663 A1 Jun. 16, 2022

(51) Int. Cl.
*H04W 4/50* (2018.01)
*H04W 4/80* (2018.01)
(Continued)

(52) U.S. Cl.
CPC .............. *H04W 4/50* (2018.02); *H04W 4/10* (2013.01); *H04W 4/80* (2018.02); *H04W 84/042* (2013.01)

(58) Field of Classification Search
CPC .............. H04L 41/0806; H04L 41/082; H04L 41/0886; H04L 41/0895; H04M 1/2757;
(Continued)

(56) References Cited

U.S. PATENT DOCUMENTS 7,260,382 B1 8/2007 Lamb
7,912,993 B2 3/2011 Ziegler
(Continued)

FOREIGN PATENT DOCUMENTS

EP          2159962 A1    3/2010
WO    WO-2017165059 A1   9/2017
WO  PCT/US2021/058011    11/2021

OTHER PUBLICATIONS https://developers.google.com/zero-touch/guides/overview - Overview/ Android zero-touch enrollment/Google Developers, Oct. 20, 2020, pp. 1-7.

*Primary Examiner* — Frank Duong
(74) *Attorney, Agent, or Firm* — Perry + Currier, Inc.

(57) ABSTRACT

A device, method and system for controlling provisioning of a mobile device is provided. An example devices determines, upon power-up, a status of a provisioning flag. The example device, in response to the provisioning flag comprising a first state associated with an out-of-box update mode, implements a first provisioning stage associated with a first communication system according to the out-of-box update mode. The example device, in response to the provisioning flag comprising a second state associated with a post-deployment update mode, implements the first provisioning stage associated with the first communication system according to the post-deployment update mode different from the out-of-box update mode. The example device implements a second provisioning stage for one or more of the second communication system and an operating system implemented at the mobile device.

20 Claims, 4 Drawing Sheets

(51) Int. Cl.
*H04W 4/10* (2009.01)
*H04W 84/04* (2009.01)

(58) Field of Classification Search
CPC ........... H04W 4/10; H04W 4/50; H04W 4/80;
H04W 8/18; H04W 12/06; H04W 12/35;
H04W 12/42; H04W 12/71; H04W 60/04;
H04W 84/042
See application file for complete search history.

(56) References Cited

U.S. PATENT DOCUMENTS

| | | | | |
|---|---|---|---|---|
| 8,526,929 | B1 * | 9/2013 | Gilbert | H04M 3/38 |
| | | | | 455/418 |
| 8,700,022 | B1 * | 4/2014 | Gilbert | H04M 3/42144 |
| | | | | 455/418 |
| 10,349,268 | B1 * | 7/2019 | Serrano | H04L 9/3268 |
| 10,477,388 | B1 * | 11/2019 | Serrano | H04L 41/082 |
| 11,026,087 | B2 * | 6/2021 | Ericksen | H04L 65/1104 |
| 2008/0108321 | A1 * | 5/2008 | Taaghol | H04W 8/265 |
| | | | | 455/410 |
| 2008/0225805 | A1 * | 9/2008 | Pearson | H04M 1/725 |
| | | | | 370/338 |
| 2011/0161659 | A1 * | 6/2011 | Himawan | H04L 9/006 |
| | | | | 713/156 |
| 2012/0275442 | A1 * | 11/2012 | Malets | H04W 4/16 |
| | | | | 455/417 |
| 2013/0023236 | A1 * | 1/2013 | Murray | H04W 8/245 |
| | | | | 455/418 |
| 2018/0020270 | A1 | 1/2018 | Colonna et al. | |
| 2019/0349880 | A1 * | 11/2019 | Serrano | H04W 60/04 |

\* cited by examiner

DEVICE, METHOD AND SYSTEM FOR CONTROLLING PROVISIONING OF A MOBILE DEVICE

BACKGROUND OF THE INVENTION

Mobile devices may have more than one communication system, each of which may need provisioning, for example, when newly purchased from a supplier, and/or when purchased, used, from a reseller, and the like. In some instances, tens to hundreds, or more, of similar mobile devices may be purchased such that the communication systems at the mobile devices may need provisioning, which can be time consuming.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Figure 1:
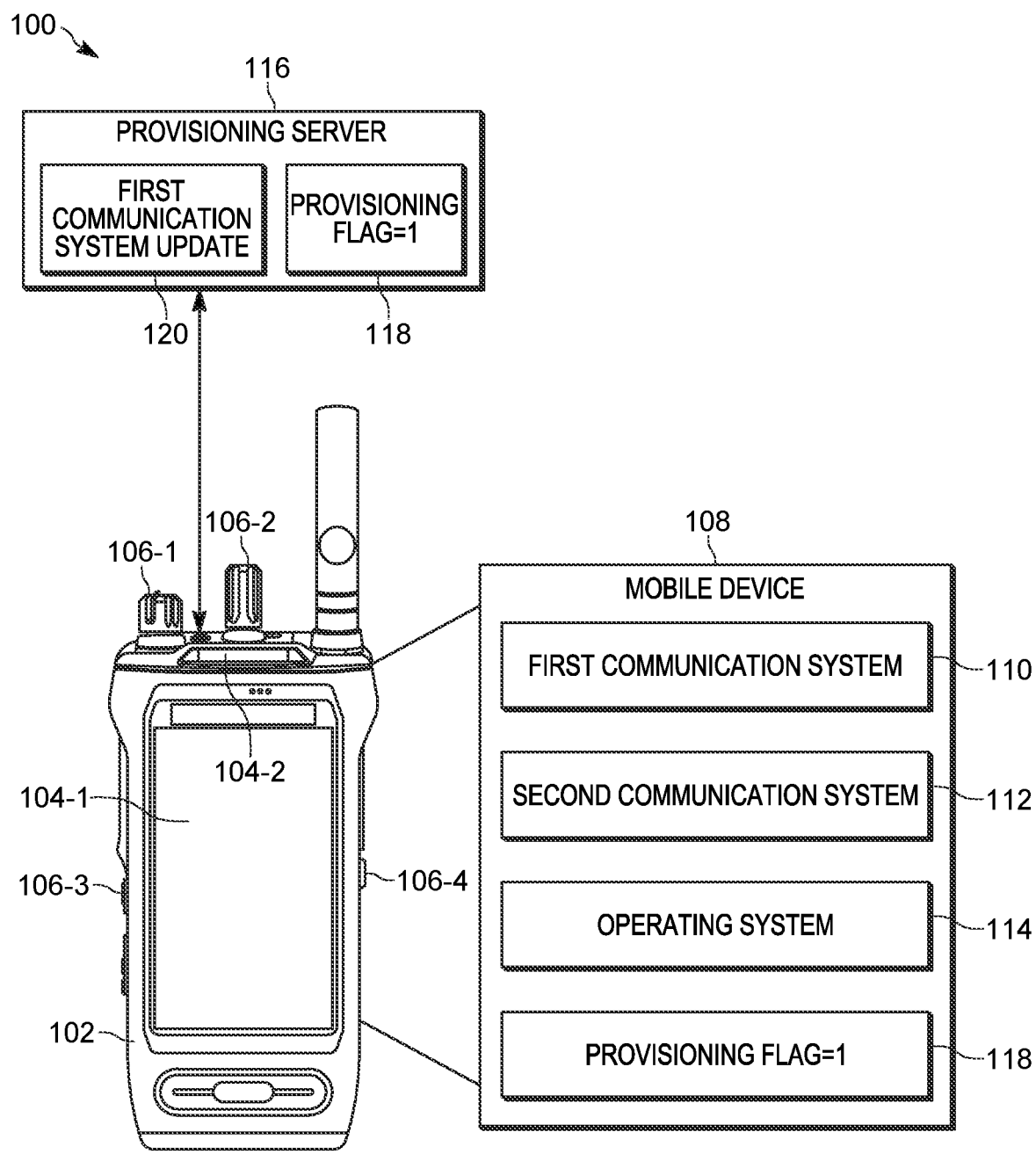
FIG. 1 is a system for controlling provisioning of a mobile device, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Mobile devices may have more than one communication system, each of which may need provisioning, for example, when newly purchased from a supplier, and/or when purchased, used, from a reseller, and the like. In some instances, tens to hundreds, or more, of similar mobile devices may be purchased such that the communication systems at the mobile devices may need provisioning, which can be time consuming. Thus, there exists a need for an improved technical method, device, and system for controlling provisioning of a mobile device.

In particular, a mobile devices, as provided herein, may comprise radio devices that may be used as Land Mobile Radio (LMR) devices and as broadband communication devices. Such mobile devices may be deployed to and/or used by first responders and the like. As such, a mobile device as provided herein, may include a first communication system, such as an LMR communication system and/or a narrowband communication system, that is used to communicate via talkgroups and/or communication channels, and the like, for example over LMR communication networks and/or narrowband communication networks, among other possibilities.

However, the mobile device as provided herein may also include a Long-Term Evolution (LTE) communication system and/or a broadband communication system and/or an operating system, that is used to wirelessly access the Internet, communicate via cell phone channels, and the like, for example over broadband communication networks and the like, among other possibilities.

The first communication system may be highly customizable by an entity operating the mobile device (e.g. a first responder entity and/or a public-safety entity), for example to program different talkgroups into the mobile device. However, the second communication system may be more generic, and may be at least partially integrated with the operating system of the mobile device, but may also be customizable by a user of the mobile device, for example to add personal contacts and/or telephone numbers thereto. As such, in a provisioning mode, an entity deploying the mobile device to a user may wish to test any provisioning of the first communication system, for example provided by a first communication system update (e.g. that may include lists of talkgroups, and the like), prior to deploying to a user, but may not wish to test any provisioning of the second communication system, which may be later customized by a user to which the mobile device is deployed.

Furthermore, as the entity may purchase tens to hundreds, and the like, of such mobile devices, the entity may wish to test any provisioning of the first communication device for only a subset of the mobile devices and/or normalize the first communication system across all the mobile devices, and deploy the mobile devices to users, who may then wish to personally provision the second communication system to customize the second communication system on a per-user basis.

As such, a provisioning mode of the mobile device provided herein may be controlled via a provisioning flag, for example downloaded to the mobile device from a provisioning server, for example prior to, and/or with, a first communication system update.

When the provisioning flag is in a first state associated with an out-of-box update mode, the mobile device may implement a first provisioning stage associated with a first communication system according to the out-of-box update mode in which, for example, a tester (e.g. an administrator) may test features and/or hardware of the first communication system once the first communication system update of the first communication system is provisioned.

However, when the provisioning flag is in a second state associated with a post-deployment update mode, the mobile device may implement the first provisioning stage associated with the first communication system according to the post-deployment update mode which may be implemented automatically and without testing by the tester.

A second provisioning stage for one or more of a second communication system and an operating system implemented at the mobile device may be implemented regardless of how the first provisioning stage is implemented. Such a second provisioning stage may be used to customize the second communication system and/or the operating system for a particular user, for example to add personal contacts, personal phone numbers, and the like, and/or to customized options of the operating system.

Hence, for example, a tester tasked with provisioning and testing many mobile devices, may provision and test a subset of the mobile devices by setting the provisioning flag to the first state at the provisioning server to provision the subset of the mobile devices in the out-of-box update mode upon power-up. Once satisfied with the first communication system update as tested at the subset of the mobile devices, the tester may change the provisioning flag to the second state at the provisioning server such that, at further mobile devices, upon power-up, the further mobile devices are updated in the post-deployment mode, without testing, as the further mobile devices download the provisioning flag, in the second state, from the provisioning server.

Furthermore, once the provisioning flag is set to the second state at the provisioning server, all the mobile devices may process further first communication system updates in the post-deployment mode.

The second provisioning stage may immediately follow the first provisioning stage and/or the second provisioning stage may be delayed until the mobile devices are deployed to users.

An aspect of the present specification provides a method comprising: determining, at a mobile device, upon power-up, a status of a provisioning flag; in response to the provisioning flag comprising a first state associated with an out-of-box update mode, implementing, at the mobile device, a first provisioning stage associated with a first communication system according to the out-of-box update mode; in response to the provisioning flag comprising a second state associated with a post-deployment update mode, implementing, at the mobile device, the first provisioning stage associated with the first communication system according to the post-deployment update mode different from the out-of-box update mode; and implementing, at the mobile device, a second provisioning stage for one or more of a second communication system and an operating system implemented at the mobile device.

Another aspect of the present specification provides a mobile device comprising: a communication unit; a first communication system; a second communication system; and a controller communicatively coupled to the communication unit, the first communication system, and the second communication system, the controller configured to: determine, upon power-up, a status of a provisioning flag; in response to the provisioning flag comprising a first state associated with an out-of-box update mode, implement a first provisioning stage associated with the first communication system according to the out-of-box update mode; in response to the provisioning flag comprising a second state associated with a post-deployment update mode, implement the first provisioning stage associated with the first communication system according to the post-deployment update mode different from the out-of-box update mode; and implement a second provisioning stage for one or more of the second communication system and an operating system implemented at the mobile device.

Each of the above-mentioned examples will be discussed in more detail below, starting with example system and device architectures of the system in which the embodiments may be practiced, followed by an illustration of processing blocks for achieving an improved technical method, device, and system for controlling provisioning of a mobile device.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for controlling provisioning of a mobile device 102. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

Furthermore, the terms "engine", "channel" "communication channel" and "talkgroup" will be used herein in singular and plural form.

In particular, as used herein, the term "engine" refers to hardware (e.g., a processor, such as a central processing unit (CPU) an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

Furthermore, the term channels and/or communication channels, as user herein are understood to include, but not limited to, talkgroups. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP (Voice-over-internet-protocol) communication path, a push-to-talk channel, and the like. Indeed, groups of channels may be logically organized into talkgroups, and/or dynamically allocated into talkgroups, though channels in a talkgroup may be dynamic as the traffic (e.g. communications) in a talkgroup may increase or decrease, and channels assigned to the talkgroup may be adjusted accordingly. Hence, calls and/or communications herein may include, but are not limited to, push-to-talk calls, VOIP calls, cell phone calls, and the like.

As depicted, the mobile device 102 is depicted in a front perspective view, showing a main display screen 104-1 and a secondary display screen 104-2 (interchangeably referred to hereafter, collectively, as the display screens 104 and, generically, as a display screen 104; this convention will be used elsewhere in the present specification), and various input devices 106-1, 106-2, 106-3, 106-4 (e.g. input devices 106 and/or an input device 106). The input devices 106 may include any suitable combination of knobs, buttons, and the like for operating the mobile device 102. Furthermore, one or more of the display screens 104 may comprise a touch display screen which may also be an input device.

Also depicted in FIG. 1 is a block diagram 108 of the mobile device 102 showing some internal components of the mobile device 102 including, but not limited to, a first communication system 110, a second communication system 112 and an operating system 114. While described in more detail below, it is understood that the communication systems 110, 112 may comprise a combination of hardware and software, and/or engines, which may be used to communicate over different communication networks.

In some examples, the first communication system 110 comprises one or more of a land mobile radio (LMR) communication system and a narrowband communication system, which may be used to communicate via communication channels and/or talkgroups at the mobile device 102, for example via an LMR communication network and/or a narrowband communication network, and the like. In some examples, the display screen 104-2 may be dedicated, and/or partially dedicated, to rendering information for operating the first communication system 110, for example to show available talkgroups and/or a list of talkgroups available for selection, and the like. In some examples, one or more the input devices 106 (including, but not limited to a knob of the input device 160-2) may be used to select a talkgroup and one or more of the input devices 106 (e.g. the input device 106-4) may comprise a push-to-talk (PTT) button for initiating communications on a selected talkgroup.

In some examples, the second communication system 112 comprises one or more of a Long-Term Evolution (LTE) communication system and a broadband communication system which may be used to conduct broadband communications, and the like, at the mobile device 102, for example via an LTE communication network and/or a broadband communication network, and the like. As such, while not depicted, the mobile device 102 may include a port for receiving a subscriber identification module (SIM) card that includes credentials for identifying the mobile device 102 on an LTE communication network and/or a broadband communication network, and the like. In some examples, the display screen 104-1 may be dedicated, and/or partially dedicated, to rendering information for operating the second communication system 112 and/or the operating system 114, and/or for rendering information during provisioning, as described below with respect to FIG. 4.

Hereafter, communication via the first communication system 110 will be described with respect to narrowband communication networks which are understood to include any suitable narrowband communication networks including, but not limited to, an LMR communication network; other examples are described in more detail below. Similarly, hereafter, communication via the second communication system 112 will be described with respect to broadband communication networks which are understood to include any suitable broadband communication networks including, but not limited to, an LTE communication network; other examples are described in more detail below.

The operating system 114 may comprise a combination of hardware and software, and/or engines, which may be used to control general functionality of the mobile device 102. In some instances, aspects of the second communication system 112 and the operating system 114 may be combined; for example, some operating systems for mobile devices generally also control broadband communications including, but not limited to, making telephone calls via the second communication system 112.

As depicted, the system 100 further comprises a provisioning server (e.g. hereafter referred to interchangeably as the server 116) which is in communication with the mobile device 102. As depicted, the server 116 stores a provisioning flag 118 (e.g. hereafter referred to interchangeably as the flag 118), which may be set to different states. For example, as depicted, the flag 118 is set to a first state (e.g. "1"), however the flag 118 may be set to a second state (e.g. "2").

The first state is understood to be associated with an out-of-box update mode at the mobile device 102, and the second state is understood to be associated with a post-deployment update mode at the mobile device 102. Both the out-of-box update mode and the post-deployment update mode are understood to be provisioning modes in which the mobile device 102 is updated, for example to install updates to the first communication system 110 and/or customize the systems 110, 112.

As used herein, the term "out-of-box update mode" is understood to include a provisioning mode that may "normally" occur when the mobile device 102 is first powered up (e.g. after being received from a factory and/or after a factory reset, for example as received from a reseller), and/or before the mobile device 102 is deployed and/or assigned to a user. As such, the mobile device 102, when first powered up, may be considered as "out of the box" and/or "off the shelf" and may be provisioned according to the out-of-box update mode, for example to install any available system updates of at least the first communication system 110.

Similarly, the term "post-deployment update mode" is understood to include a provisioning mode that may "normally" occur when the mobile device 102 is powered up a second time, and/or later powered up, and the like, after the first power-up, and/or after being deployed. As such, the mobile device 102, when later powered up, may be considered as being deployed and may be provisioned according to the post-deployment update mode for example to install any available system updates of at least the first communication system 110.

However, regardless of whether the mobile device 102 is powered up a first time (e.g. after being received from a factory and/or after a factory reset), or a later time, the provisioning mode of the mobile device 102 is understood to occur according to the provisioning flag 118, which may be downloaded from the server 116 upon a first power-up.

However, as also seen in the block diagram 108 of the mobile device 102 in FIG. 1, the flag 118 is initially stored at the mobile device 102 in the first state (e.g. "1"), for example as set at a factory, as a default codeplug (e.g. a factory-set parameter). It is further understood that, when a factory reset occurs at the mobile device 102, the flag 118, as stored at the mobile device 102 is reset to the first state. Hence, whether as received from a factory, or a reseller after a factory reset, the flag 118 as stored at the mobile device 102 is understood to initially be in the first state.

As will also be described below, when the mobile device 102 is initially turned on (e.g. after being received from a factory and/or after a factory reset), the mobile device 102 may communicate with the server 116 and change the flag 118 as stored at the mobile device 102 to the state of the flag 118 as stored at the server 116.

Hereafter, references to a first power-up, and the like, of the mobile device 102 is understood to occur after being received from a factory and/or after a factory reset of the mobile device 102. Put another way, examples of provisioning described herein, upon a first power-up, are understood to occur when the mobile device 102 is in a factory state and/or out-of-box state and/or a factory reset state, and the like. Furthermore, a factory reset may occur at the mobile device 102 by a reseller of the mobile device 102, for example a reselling entity that purchases the mobile device 102 and later resells the mobile device 102 to another entity.

As depicted, the server 116 further stores a first communication system update 120, which may comprise, for example, a list of talkgroups and/or other parameters for customizing the first communication system 110. Another example of information which may be provided in the first communication system update 120 may include, but is not limited to, a network address of an LMR applications server associated with the entity operating and/or managing the system 100. The first communication system update 120 is interchangeably referred to hereafter as the update 120.

In general, the flag 118 and the update 120 may be provisioned at the server 116 by an administrator of the system 100 and/or an entity managing the system 100, including, but not limited to, a first responder entity and/or a public-safety entity, and the like. For example, the update 120 may comprise a list of talkgroups, and the like, that are particular to the entity managing the system 100, who may wish to have the list of talkgroups installed at all mobile devices managed by the entity. Hence, while only one mobile device 102 is depicted, the system 100 may comprise a plurality of mobile devices 102 that are to be provisioned according to the state of the flag 118, as stored at the server 116, and at which the update 120 is to be installed.

As such, it is understood that the server 116 may be operated by the entity managing the system 100. While not depicted, it is further understood that the server 116 may comprise any suitable combination of input devices, and/or the server 116 may be accessed remotely, such that an administrator of the system 100 and/or a tester of the mobile device 102, may change the flag 118, as stored at the server 116, to different states and/or upload updates to the first communication system 110, including, but not limited to, the depicted update 120. The server 116 is hence also understood to include any suitable combination of communication units and/or network interfaces and/or transceivers for communicating with the mobile device 102 via a suitable communication link.

It is further understood that the mobile device 102 and the server 116 are generally configured to establish a communication link therebetween when the mobile device 102 is initially turned on (e.g. after being received from a factory and/or after a factory reset).

For example, the server 116 may be associated with a network address (e.g. an Internet Protocol (IP) address) which may be preconfigured at the mobile device 102, for example as a default codeplug (e.g. a factory-set parameter), and the like, at the mobile device 102. Furthermore, a WiFi access point (not depicted), providing access to a communication network (e.g. the Internet), and the like, may be provided local to the mobile device 102, the WiFi access point having a WiFi access point identifier (e.g. a Service Set Identifier (SSID)) and/or any suitable credentials and/or WiFi credentials (e.g. an SSID and an optional password, and the like) which may also be preconfigured at the mobile device 102, for example as a default codeplug, and the like. In these examples, upon power-up, and/or a first power-up, the mobile device 102 may automatically establish a communication link with the server 116 via the WiFi access point, using the preconfigured WiFi credentials (e.g. and a WiFi transceiver at the mobile device 102) and the preconfigured network address of the server 116.

Examples where a local WiFi access point is provided local to the mobile device 102, using WiFi credentials provided at a default codeplug of the mobile device 102 assume that the entity managing the system 100 has resources to provision a local WiFi access point having such WiFi credentials. However, in examples the entity managing the system 100 may not have resources to provision such a WiFi access point having such WiFi credentials local the mobile device 102. In these examples, upon power-up, and/or a first power-up, the mobile device 102, in response to not "finding" a WiFi access point having the WiFi credentials of the default code plug, prior to entering a provisioning mode, may provide any suitable options for connecting to any suitable communication network to establish the communication link between the mobile device 102 and the server 116. For example, the mobile device 102 may be configured to determine WiFi credentials of other WiFi access points local to the mobile device 102. Such options may be provided at the display screen 104-1 for manually entering WiFi credentials of WiFi access points local to the mobile device 102, and the like, and/or such options may be provided at the display screen 104-1 for capturing a QR (quick response) code using a camera of the mobile device 102, the QR code having the WiFi credentials of a local WiFi access point embedded therein and decoded by the mobile device 102.

In some examples, however, when there are no WiFi credentials provided as a default codeplug, the mobile device 102 may provide options for establishing a communication link between the mobile device 102 and the server 116 via the second communication system 112 and/or the operating system 114 (e.g. prior to provisioning as described herein), for example to search for, and connect to, any suitable broadband communication network and/or any suitable WiFi access point local to the mobile device 102, and/or, and the like. Once a communication link with a broadband network and/or a WiFi Access point is established, the mobile device 102 may use the preconfigured network address of the server 116 to establish the communication link with the server 116. In examples, where the mobile device 102 sets up a communication link to a broadband communication network via the second communication system 112 (e.g. prior to provisioning as described herein) an option to insert a Subscriber Identify Module (SIM) card into a port of the mobile device 102 may be provided (e.g. at the display screen 104-1); when such a SIM card is inserted into such a port, the mobile device 102 may automatically download, from a cloud device associated with an entity that provided the operating system 114, any updates (e.g. referred to hereafter as "network updates") to the operating system 114 (e.g. security updates, new features, and the like), which is different from provisioning and/or customizing the operating system 114 by a user as described herein. Hence, a communication link between the mobile device 102 and the server 116 may be established in any suitable manner; indeed, in some examples, the network address of the server 116 may be provided via an input device 106 and/or a touch screen of the display screen 104-1.

Regardless of how the communication link between the mobile device 102 and the server 116 is set up, upon a first power-up, the mobile device 102 may download the flag 118 and the update 120 from the server 116, and provision the first communication system 110 according to a state of the flag 118. When the flag 118 is downloaded from the server 116, the value of the flag 118 as stored at the mobile device 102 is changed to the value of the flag 118 as downloaded from the server 116.

When, as depicted in FIG. 1, the flag 118 is in a first state associated with an out-of-box update mode (e.g. "1" as depicted), the mobile device 102 implements a first provisioning stage associated with the first communication system 110. In some examples of the out-of-box update mode, the mobile device 102 downloads the update 120 from the server 116, installs the update 120 (which may include rebooting the mobile device 102), and pauses provisioning (e.g. after the reboot) to allow for a tester to test the first communication system 110. In these examples, the mobile device 102 may further provide an option (e.g. as described below with respect to FIG. 4) for a tester to end testing of the first communication system 110 to continue to a second provisioning stage for one or more of the second communication system 112 and the operating system 114, described in more detail below.

However, when the flag 118 is in a second state associated with a post-deployment update mode (e.g. "2"), the mobile device 102 implements the first provisioning stage associated with the first communication system 110 for example, to install the update 120 and continues to the second provisioning stage without a pause for a tester to test the first communication system 110. However, testing is but one example of a difference between the out-of-box update mode and the post-deployment update mode and such modes may differ in other ways, also described below.

As such, if the mobile device 102 is one of a plurality of mobile devices 102, a subset of which have already been tested, the tester may change the flag 118 at the provisioning server 116 to the second state so that the mobile device 102, upon a first power-up, changes the flag 118, as stored therein, to the second state such that the first provisioning stage occurs in the post-deployment mode. As such, a tester may control whether mobile devices 102 being provisioned upon a first power-up, provision respective first communication system 110 in the out-of-box update mode or the post-deployment update mode.

The mobile device 102 may further implement the second provisioning stage for one or more of the second communication system 112 and the operating system 114 for example immediately after the first provisioning stage and/or upon deployment to a user so that the second communication system 112 and/or the operating system 114 may be customized.

Furthermore, upon completion of the first provisioning stage in the out-of-box update mode, the mobile device 102 may change the flag 118 as stored therein to the second state such that, after another power-up, the first provisioning stage may occur in the post-deployment update mode, for example when further updates are available from the server 116. In addition, the second communication system 112 and/or the operating system 114 may undergo a reset (e.g. when a user logs out of the operating system 114) without changing the state of the flag 118 as stored at the mobile device 102; such a reset may cause the second provisioning stage to again be implemented, but, as the flag 118 as stored at the mobile device 102 is in the second state, any associated reimplementation of the first provisioning state occurs in the post-deployment update mode.

As such, the mobile device 102 may be reassigned and/or redeployed to another user associated with the entity managing the system 100, without needing to do a full factory reset of the mobile device 102 and hence with the first communication system 110 persisting in such a reassignment or redeployment.

However, when the mobile device 102 is resold, the mobile device 102 may undergo a factory reset which resets the flag 118 as stored at the mobile device 102 to the first state so that a purchaser of the mobile device 102 may provision the mobile device 102 with the first provisioning stage in the out-of-box deployment mode to customize and test the first communication system 110 using a respective update at a respective server, and the like.

Figure 2:
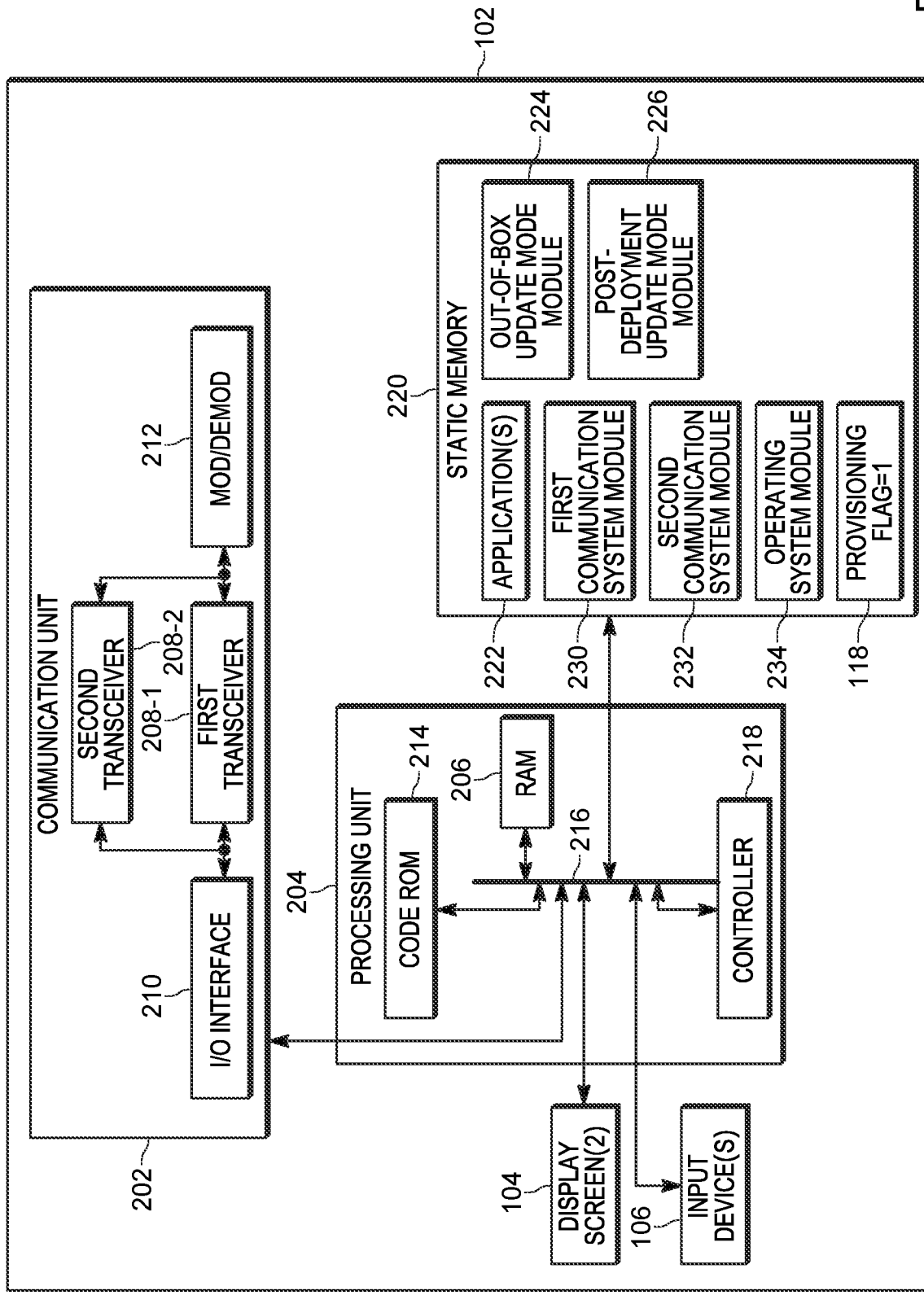
FIG. 2 is a device diagram showing a device structure of a mobile device which controls provisioning, in accordance with some examples.

Attention is next directed to FIG. 2 which depicts a schematic block diagram of an example of the mobile device 102. As depicted, the mobile device 102 comprises: the display screens 104, the input devices 106, a communication unit 202, a processing unit 204, a Random-Access Memory (RAM) 206, a first wireless transceiver 208-1 and a second wireless transceiver 208-2 (e.g. transceivers 208 and/or a transceiver 208), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g. separate RAM 206 and ROM 214), memory of the mobile device 102 may have any suitable structure and/or configuration.

As shown in FIG. 2, the mobile device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 which are configurable to communicate with different types of communication networks. For example, the communication unit 202 may include the first transceiver 208-1 configured to communicate with a first type of communication network, and the second transceiver 208-2 configured to communicate with a second type of communication network. Furthermore, while each transceiver 208 is depicted as a single transceiver, each transceiver 208 may comprise one or more respective transceivers configured to communicate with communication networks of a respective type.

For example, the first transceiver 208-1 may be adapted for communication with one or more narrowband networks including, but not limited to, an LMR network, a DMR (Digital Mobile Radio) network, a P25 network, a Terrestrial Trunked Radio (TETRA) network. Hence, the first transceiver 208-1 may include, but is not limited to, one or more of an LMR transceiver, a DMR transceiver, P25 transceiver, a TETRA transceiver, and/or another similar type of wireless transceiver configurable to communicate via any suitable narrowband communication network.

In contrast, the second transceiver 208-2 may be adapted for communication with one or more broadband communication networks including, but not limited to, one or more of an LTE network and/or other types of Global System for Mobile Communications (GSM) and/or 3rd Generation Partnership Project (3GPP) networks, a 5G network, and/or another similar type of broadband communication system and/or wireless network, and the like. Hence, the second transceiver 208-2 may include, but is not limited to, one or more of a cell phone transceiver, a 3GPP transceiver, an LTE transceiver, a GSM transceiver, a 5G transceiver, and/or another similar type of wireless transceiver configurable to communicate via broadband communication network.

While the transceivers 208 are depicted as being components of a same communication unit 202, and sharing resources with the one or more wired and/or wireless input/output (I/O) interfaces 210 and the modulator/demodulator 212, in other examples, the mobile device 102 may comprise two or more communication unit 202, and the transceivers 208 may be components of respective communication units 202, with respective input/output (I/O) interfaces 210 and respective modulator/demodulators 212 provided for the communication units 202.

Furthermore, while not depicted, the mobile device 102 may include transceivers for communicating on other types of networks, including, but not limited to a Wi-Fi network, for example operating in accordance with an IEEE 802.11 standard (e.g., 802.11a, 802.11b, 802.11g), Bluetooth™ network, a near field communication (NFC) network, a WiMAX network, and the like. In particular, when the communication link between the mobile device 102 and the server 116 is a WiFi communication link, the mobile device 102 comprises a WiFi transceiver.

The controller 218 may include ports (e.g. hardware ports) for coupling to other suitable hardware components of the system 100, which may include, but is not limited to, a port for receiving a SIM card.

The controller 218 may include one or more logic circuits, one or more processors, one or more microprocessors, and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for controlling provisioning of a mobile device. For example, in some examples, the computing device 102 and/or the controller 218 specifically comprises a computer executable engine configured to implement functionality for controlling provisioning of a mobile device.

While not depicted, the controller 218 may include a first controller and/or processor, and the like, at least partially dedicated to the first communication system 110, and a second a second controller and/or processor, and the like, at least partially dedicated to the second communication system 112 and the operating system 114.

The static memory 220 comprises a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 102 as described herein are maintained, persistently, at the memory 220 and used by the controller 218, which makes appropriate utilization of volatile storage during the execution of such programming instructions.

Figure 3:
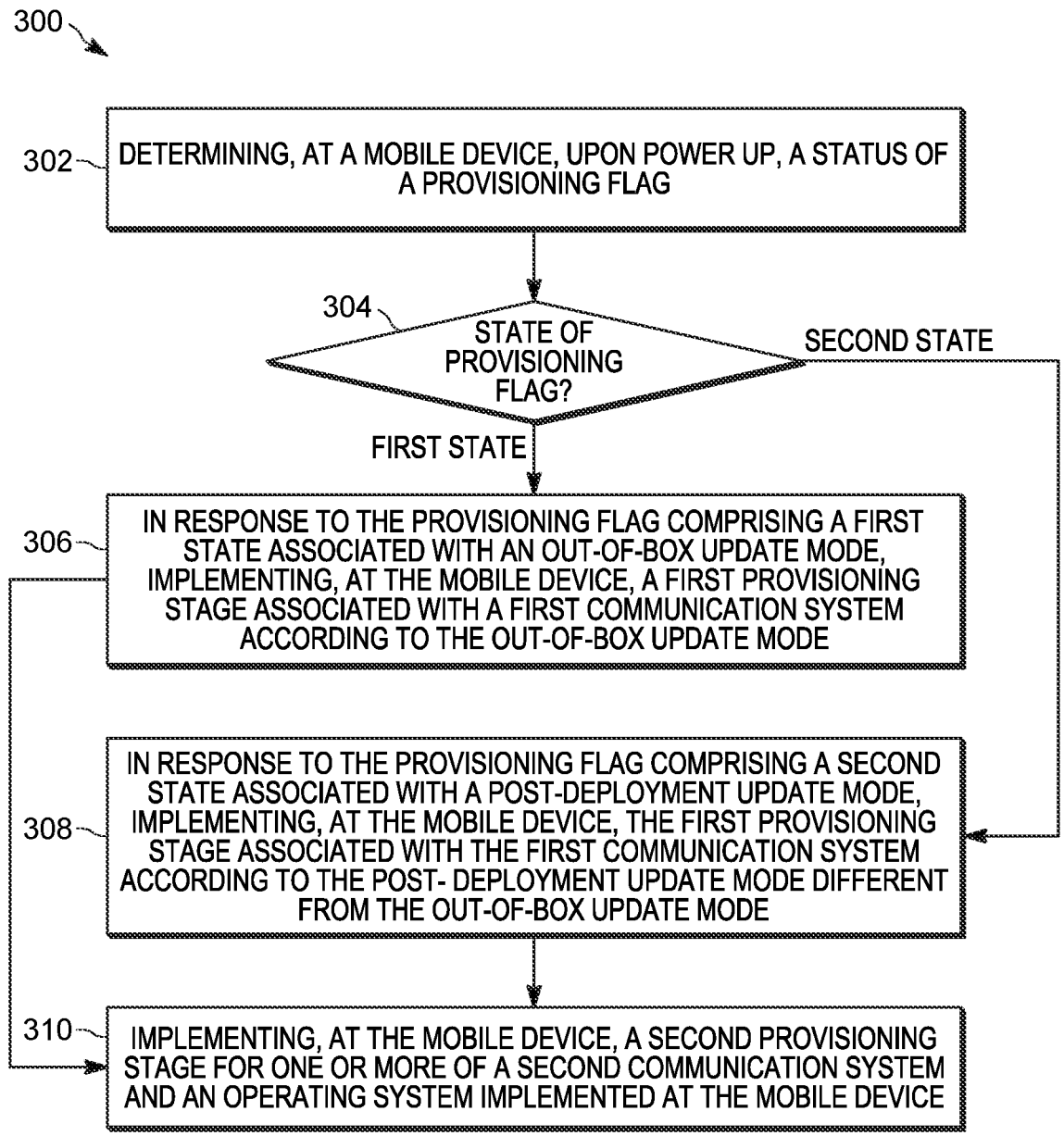
FIG. 3 is a flowchart of a method for controlling provisioning of a mobile device, in accordance with some examples.

In particular, the memory 220 stores instructions corresponding to the at least one application 222 that, when executed by the controller 218, enables the controller 218 to implement functionality for controlling provisioning of a mobile device, including but not limited to, the blocks of the methods set forth in FIG. 3.

As depicted, the memory 220 further stores an out-of-box update mode module 224 and a post-deployment update mode module 226, which may be respectively used, by the controller 218, when executing the application 222, to respectively implement the out-of-box update mode module or the post-deployment update mode, depending on a value of the flag 118.

As also depicted, the memory 220 stores the flag 118, for example initially in the first state though, as described herein, the state of the flag 118 may be changed, upon a first power-up of the mobile device 102, to align with the state of the flag 118 at the server 116 and/or by the controller 218 and/or the mobile device 102 for example in conjunction with implementing the out-of-box update mode.

As depicted, the memory 220 further stores a first communication system module 230, a second communication system module 232, and an operating system module 234 which respectively comprise instructions respectively corresponding to the first communication system 110, the second communication system 112, and the operating system 114.

In particular, the first communication system 110 may comprise the first communication system module 230, the first transceiver 208-1, and a controller least partially dedicated to the first communication system 110, which may implement the first communication system module 230, for example as a first communication system engine.

Similarly, the second communication system 112 may comprise the second communication system module 232, the second transceiver 208-2, and a controller least partially dedicated to the second communication system 112, which may implement the first communication system module 232, for example as a second communication system engine.

Similarly, the operating system 114 may comprise the operating system module 234 and a controller least partially dedicated to the operating system 114, which may implement the operating system module 234, for example as an operating system engine.

In illustrated examples, when the controller 218 executes the one or more applications 222, the controller 218 is enabled to: determine, upon power-up, a status of a provisioning flag; in response to the provisioning flag comprising a first state associated with an out-of-box update mode, implement a first provisioning stage associated with a first communication system according to the out-of-box update mode; in response to the provisioning flag comprising a second state associated with a post-deployment update mode, implement the first provisioning stage associated with the first communication system according to the post-deployment update mode different from the out-of-box update mode; and implement a second provisioning stage for one or more of a second communication system and an operating system implemented at the mobile device.

While components of the server 116 are not depicted, the server 116 may have a structure similar to that of the mobile device 102 as depicted in FIG. 2, but adapted for the functionality of the server 116. For example, the server 116 may include a controller, a communication unit and a memory for providing updates to the first communication system 110 at the mobile device 102 and/or a plurality of mobile devices 102. The server 116 may further include components for a tester to change the state of the flag 118 at the server 116 and/or to receive updates to the first communication system 110 that are to be provided to the mobile device 102 and/or a plurality of mobile devices 102.

Attention is now directed to FIG. 3 which depicts a flowchart representative of a method 300 for controlling provisioning of a mobile device. The operations of the method 300 of FIG. 3 correspond to machine readable instructions that are executed by the mobile device 102, and specifically the controller 218 of the mobile device 102. In the illustrated example, the instructions represented by the blocks of FIG. 3 are stored at the memory 220 for example, as the application 222. The method 300 of FIG. 3 is one way in which the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the components of method 300 are referred to herein as "blocks" rather than "steps. The method 300 of FIG. 3 may be implemented on variations of the system 100 of FIG. 1, as well.

At a block 302, the controller 218 and/or the mobile device 102 determines, upon power-up, a status of the provisioning flag 118.

For example, as described above, upon a first power-up, the controller 218 and/or the mobile device 102 establishes a communication link with the provisioning server 116 using one or more of a variety of different processes and aligns a state of the flag 118 stored at the memory 220 with the flag 118 as stored at the server 116. At a later power-up of the mobile device 102, the flag 118 as stored at the memory 220 does not change. Hence, at the block 302, the controller 218 and/or the mobile device 102 may upon a first power-up, retrieving the provisioning flag 118 from the provisioning server 116, but otherwise the controller 218 and/or the mobile device 102 determines, upon power-up, a status of the provisioning flag 118 as stored at the memory 220 (e.g. which occur after a state of the flag 118 stored at the memory 220 is aligned with the flag 118 as stored at the server 116 upon a first power-up).

At block 304, the controller 218 and/or the mobile device 102 makes a decision as to which of two provisioning modes to enter based on the status of the provisioning flag, For example, in response to the provisioning flag comprising a first state (e.g. "1") associated with an out-of-box update mode, at a block 306, the controller 218 and/or the mobile device 102 implements a first provisioning stage associated with a first communication system according to the out-of-box update mode.

Returning briefly to the block 304, in response to the provisioning flag comprising a second state (e.g. "2") associated with a post-deployment update mode, at a block 308, the controller 218 and/or the mobile device 102 implements the first provisioning stage associated with the first communication system 110 according to the post-deployment update mode different from the out-of-box update mode.

In particular, regardless of a state of the flag 118, in the first provisioning stage the update 120 may be downloaded from the server 116 and installed at the first communication system 110, for example to install talkgroups particular to an entity managing the system 100 at the mobile device 102, among other possibilities. Furthermore, in some examples, to complete an installation of the update 120, the controller 218 may control the mobile device 102 to reboot (e.g. power-down and power-up).

Returning to the block 306, the first provisioning stage according to the out-of-box update mode is next described, which may be implemented via execution of the out-of-box update mode module 230. In particular, in the out-of-box update mode, user testing of the first communication system 110 may be provided as an option prior to implementing a second provisioning stage (e.g. as described below with respect to the block 310). For example, in the out-of-box update mode, after the mobile device 102 reboots, the overall provisioning process may pause, at the mobile device 102, in a testing mode, to allow a tester to test the first communication system 110. In such a testing mode, a tester of the mobile device 102 may operate the mobile device 102 to test the first communication system 110, for example by operating the input devices 106 to view lists of talkgroups provided in the update 120 at the display screen 104-2, and the like, and/or select a talkgroup and/or initiate communications on a selected talkgroup, for example by operating an input device 106, such as a PTT button of the input device 106-4. However, any suitable testing of the first communication system 110 is within the scope of the present specification.

In the testing mode, the controller 218 and/or the mobile device 102 may provide an electronic button at the display screen 104-1, which when selected via an input device 106 and/or a touch screen of the display screen 104-1, causes the controller 218 and/or the mobile device 102 to continue to the second provisioning stage. Such a selection may occur when the tester has completed the testing of the first communication system 110. In some examples, when no input is received at the mobile device 102 for a given time period (e.g. no testing occurs and/or the electronic button is not selected), the controller 218 and/or the mobile device 102 continues to the second provisioning stage.

Returning to the block 308, the first provisioning stage according to the post-deployment update mode is next described, which may be implemented via execution of the post-deployment update mode module 232. In particular, it is understood that the post-deployment update mode is different from the out-of-box update mode. For example, in the post-deployment update mode, user testing of the first communication system 110 may not be provided. Put another way, in the post-deployment update mode, implementing a second provisioning stage (e.g. as described below with respect to the block 310) occurs following, or immediately following, the first provisioning stage, without user testing and/or without pausing in a testing mode.

Rather, installation of the update 120 may occur without providing for user testing, though other differences between the out-of-box update mode and the post-deployment update mode are within the scope of the present specification. For example, in the out-of-box update mode, but not the post-deployment update mode, automatic testing of the first transceiver 208-1 may occur. One example of such an automatic test may include, but is not limited to, registering the mobile device 102 with an LMR Applications server, and the like (e.g. a network address of which may be included in the update 120) over a narrowband communication network, and the like. for example to test the capability and/or functionality of the of the first transceiver 208-1 (e.g. to ensure the transceiver 208-1 is operational before the mobile device 102 is deployed to a user) and/or to test connectivity to the LMR applications server. Furthermore, in some examples, a report of such an automatic test may be provided at the display screen 104-1 and/or the display screen 104-2, which may indicate a successful, or unsuccessful, registration with the LMR applications server.

In some examples, after the first provisioning stage has occurred at the block 306 according to the out-of-box provisioning mode, the controller 218 and/or the mobile device 102 may change the flag 118 stored at the memory 220 to the second state (e.g. "2") such that a next time the mobile device 102 is powered up, the first provisioning stage may occur according to the post-deployment update mode. In these examples, the first provisioning stage may occur only when a new first communication system update is available at the server 116 (e.g. which may include more and/or different talkgroups than in the update 120). Put another way, in some examples, each time the mobile device 102 is powered up, the mobile device 102 may communicate with the server 116 to check for an update to the first communication system 110 and, when such an update is available, the first provisioning stage may be repeated according to the state of the flag 118 as stored at the memory 220 (e.g. which is set to the second state when the out-of-box update mode completes so that the first provisioning stage occurs according to the post-deployment update mode).

Regardless of whether the first provisioning stage was implemented according to the out-of-box update mode or the post-deployment update mode, at a block 310, the controller 218 and/or the mobile device 102 implements a second provisioning stage for one or more of the second communication system 112 and the operating system 114 implemented at the mobile device 102.

For example, in the second provisioning stage (which may be implemented via a module of the application 222 and/or another module, not depicted in FIG. 2), the mobile device 102 may be operated by a user to which the mobile device 102 may be deployed (e.g. who may be different from a tester) to log into an account associated with an entity that provided the operating system 114. Such a log-in may cause the mobile device 102 to communicate with a cloud device associated with the entity that provided the operating system 114 for example to download customized options associated with the second communication system 112 and/or the operating system 114. Such customized options may include, but are not limited to, personal contact lists, personal telephone lists, and the like, for the second communication system 112, and/or color schemes, wallpapers, of "apps", notification settings for the "apps", and the like, for the operating system 114, among other possibilities. However, such customized options may alternatively be received and/or selected via one or more input devices 106 and/or a touch screen of a display screen 104, and the like.

In particular, in the second provisioning stage, the display screen 104-1 may be controlled by the controller 218 and/or the mobile device 102 to provide one or more views for customizing the second communication system 112 and/or the operating system 114. Put another way, in the second provisioning stage, options may be provided (e.g. at the display screen 104-1) for setting up user options for one or more of the second communication system 112 and the operating system 114, including, but not limited to, options for the aforementioned logging into an account of a user to which the mobile device 102 is deployed.

Hence, between the first provisioning stage and the second provisioning stage the mobile device 102 may be deployed to a user who may operate the mobile device to customize the second communication system 112 and the operating system 114.

Furthermore, between the first provisioning stage and the second provisioning stage the mobile device 102 may be powered off and deployed to such a user and, when the mobile device 102 is again powered on, as the flag 118 stored at the memory 220 has been set to the second state (e.g. "2"), as described above, the first provisioning stage may again be implemented but in the post-deployment provisioning mode and/or only when a new update is available from the server 116.

Such examples further illustrate that the controller 218 and/or the mobile device 102 may be further configured to communicate with the server 116, post deployment to a user, for example using one or more of the transceivers 208. Such examples further illustrate that the controller 218 and/or the mobile device 102 may be further configured to determine when an update at the server 116 is "new", for example by comparing stored information identifying a last update (e.g. such as the update 120) with similar information identifying a current update (e.g. which may include, but is not limited to, respective file names of the updates, hashes of the updates, and the like).

It is further understood that the second provisioning stage may include automatically downloading, from a cloud device associated with an entity that provided the operating system 114, any network updates to the operating system 114 (e.g. security updates, new features, and the like).

It is further understood that after the second provisioning stage occurs a first time, the controller 218 and/or the mobile device 102 may store another flag (e.g. different from the flag 118) indicating that the second provisioning stage has occurred such that, when the mobile device 102 is again powered up, the second provisioning stage may not again occur, though a user may operate a menu system at the mobile device 102 (e.g. provided at the display screen 104-1) to further customize the second communication system 112 and the operating system 114. In a particular example, when, in the second provisioning stage, an account log-in occurred, as described above, such an account log-in may persist when the mobile device 102 is powered off and again powered on.

Various alternatives of the method 300 are next described.

In one example, the method 300 may further comprise the controller 218 and/or the mobile device 102: upon power-up, communicating with the provisioning server 116 to determine whether an update for the first communication system 110 is available (e.g. the update 120 and/or another update); in response to determining that the update for the first communication system 110 is available, implementing the out-of-box update mode or the post-deployment update mode according to the provisioning flag 118; and in response to determining that an update for the first communication system update 120 is not available, implementing the second provisioning stage without implementing the first provisioning stage. Hence, in these examples, the first provisioning stage may be implemented only when an update, and/or a new update, for the first communication system 110 is available at the server 116.

In another example, the method 300 may further comprise the controller 218 and/or the mobile device 102: prior to implementing the second provisioning stage determining whether the second provisioning stage was previously implemented (e.g. using a respective flag, as described above); in response to determining that the second provisioning stage was not previously implemented, implementing the second provisioning stage; and in response to determining that the second provisioning stage was previously implemented, skipping implementing the second provisioning stage, other than to install available network updates for the operating system 114.

In yet another example, the method 300 may further comprise the controller 218 and/or the mobile device 102: in response to completing the first provisioning stage in the out-of-box update mode, change the flag 118, as stored at the memory 220 of the mobile device 102, from the first state to the second state; and in response to a factory reset being performed at the mobile device 102, changing the flag 118, as stored at the memory 220 of the mobile device 102, from the second state to the first state, such that the first provisioning stage is again implemented in the out-of-box update mode after a next power-up of the mobile device 102. Hence, when a factory reset is performed at the mobile device 102, the flag 118 at the memory 220 is reset to the first state as described above.

Figure 4:
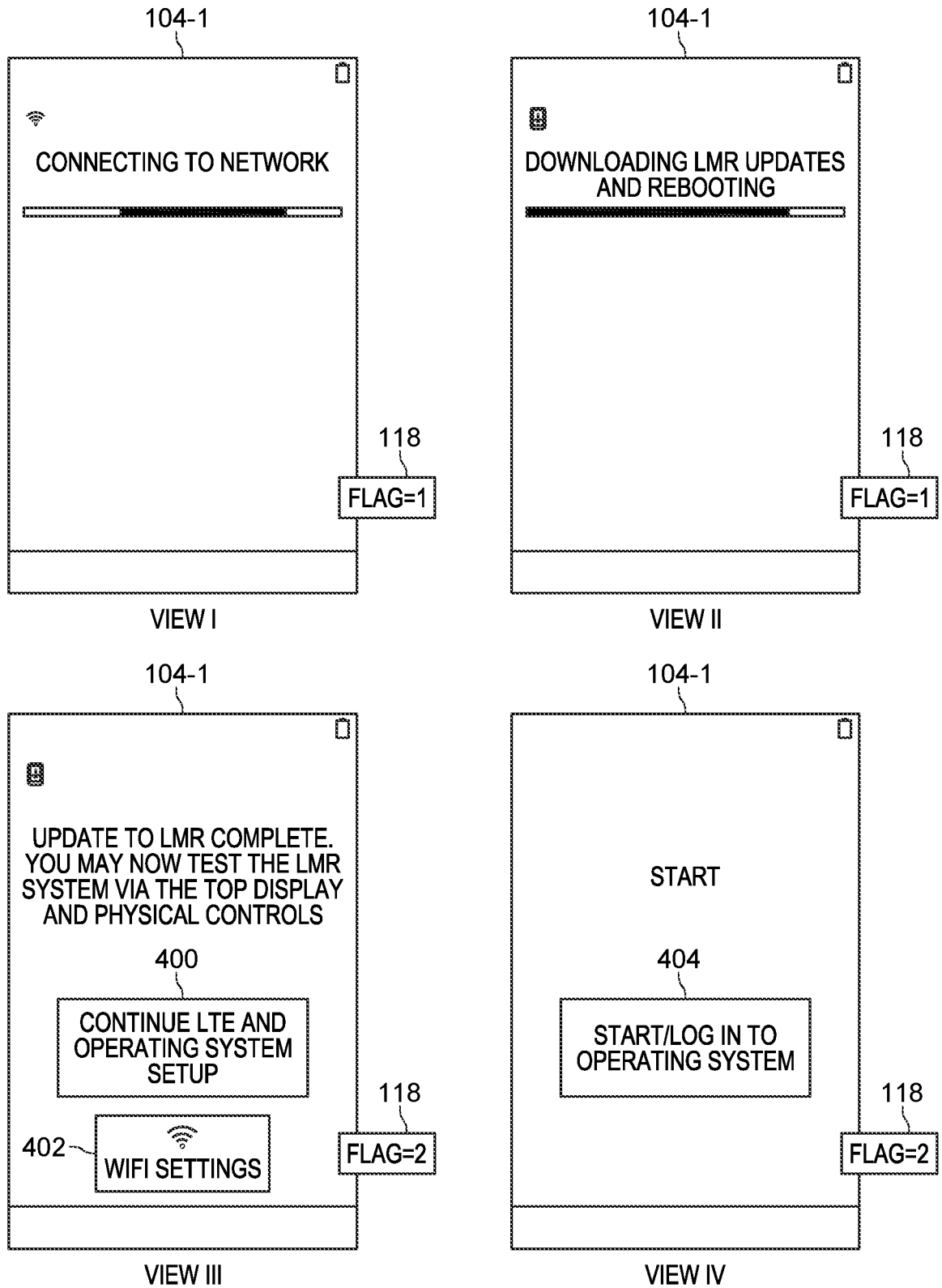
FIG. 4 is an example of implementing a method for controlling provisioning of a mobile device at the mobile device of FIG. 1, in accordance with some examples.

Attention is next directed to FIG. 4 which depicts a sequence of views I, II, III, IV which may be provided at the display screen 104-1, for example in chronological order, as the method 300 is implemented at the mobile device 102. As such, while the views I, II, III, IV show the display screen 104-1 without the remainder of the mobile device 102, it is understood that the remainder of the mobile device 102 is nonetheless present. For clarity, the flag 118 as stored at the memory 220 is also depicted in the views I, II, III, IV, described in more detail below. It is further understood in FIG. 4 that the update 120 is available at the server 116 and the flag 118, at the server 116, is in the first state.

Furthermore, it is understood that the views II, III show the mobile device 102 in the first provisioning stage to provision the first communication system 110, while the view IV shows the mobile device 102 at a beginning of the second provisioning stage to provision the second communication system 112.

Beginning with the view I, when the mobile device 102 is first powered-on (e.g. after being received from a factory and/or after a factory reset, and hence the flag 118 is in the first state (e.g. "1")), the mobile device 102 is understood to automatically connect to a WiFi access point and/or a communication network as described herein, to establish a communication link between the mobile device 102 and the server 116 As described herein, the view I may be replaced and/or may include other views for receiving WiFi credentials to connect to a WiFi access point, a broadband communication network, and the like.

At the view II, which follows the view I in time, when a communication link between the mobile device 102 and the server 116 is established, the mobile device 102 is understood to be downloading the update 120 (e.g. an LMR update as indicated by the text "DOWNLOADING LMR UPDATES") and the flag 118, remains in the first state (e.g. "1") associated with an out-of-box update mode, as the flag 118 at server 116 is also in the first state. Once the update 120 is downloaded, the mobile device 102 reboots, as also indicated in the view II (e.g. as indicated by the text "REBOOTING"). The view II may be replaced with a plurality of views indicating that the mobile device 102 is one or more of checking for an update from the server 116, downloading an update (e.g. when available), "unpacking" the update (e.g. which may be compressed), and rebooting and/or restarting the mobile device 102.

Attention is next directed to the view III, which follows the view II in time, and indicates that the update 120 has been installed (e.g. "Update To LMR" Complete). As depicted, the flag 118 remains in the first state (e.g. "1") so that after the reboot of the mobile device 102, provisioning of the mobile device 102 pauses and the mobile device 102 is now in a testing mode. In the depicted testing mode, an LMR system (e.g. the first communication system 110) may be tested for example via operation of "Physical Controls" (e.g. input devices 106 for operating the first communication system 110) and the "Top Display" (e.g. the display 104-2). A tester may then manually test the first communication system 110 operating knobs, buttons, and the like, of the input devices 106 to view available talkgroups at the display screen 104-2 (e.g. as the display screen 104-1 is showing the view III) and/or select a talkgroup to communicate, among other possibilities.

Furthermore, in the view III, the flag 118 has been changed to the second state, for example after entering the test mode, such that, when the mobile device 102 again reboots, the view III may be skipped (though the view II, and the like, may not be skipped when a new update is available at the server 116).

The view III further includes an electronic button 400, which, when actuated, causes the mobile device 102 to leave the testing mode and end the first provisioning stage. Actuation of the electronic button 400 further initiates the second provisioning stage to provision, for example the second communication system 112 and/or the operating system 114 (e.g. the electronic button 400 includes text "Continue LTE And Operating System Setup"). As depicted, the view III further includes an optional electronic button 402 which may be used to navigate to a view (not depicted) for changing WiFi settings at the mobile device 102.

Attention is next directed to the view IV, which follows the view III in time after the electronic button 400 has been actuated to end the first provisioning stage and begin the second provisioning stage. However, it is understood that at the view III or the view IV, the mobile device 102 may be powered down and deployed to a specific user who may power the mobile device 102 back on; as such, the mobile device 102 may again optionally provide the view II (e.g. when a new update is available at the server 116) and skip the view III (e.g. as the flag 118 stored at the memory 220 has been changed to the second state (e.g. "2")).

Regardless, the view IV is provided at the display screen 104-1 which, as depicted, is a "Start" screen for beginning the second provisioning stage. The mobile device 102 may pause on the view IV until an electronic button 404 is actuated by a user to continue the second provisioning stage which may include, but is not limited to, locally logging into a cloud account associated with the operating system 114, and the like, among other possibilities.

As such the electronic button 404 includes text "START/LOG IN TO OPERATING SYSTEM" to indicate that, when the electronic button 404 is actuated, options will be provided at the display screen 104-1 for provisioning and/or configuring and/or logging into the operating system 114, in the second provisioning stage, which may include provisioning and/or configuring the second communication 112 as has previously been described. Hence, in some examples, the mobile device 102 may request manual confirmation to proceed to the second provisioning stage. Indeed, at the view IV, the mobile device 102 may be provided to a user who will be using the mobile device 102, and/or the mobile device 102 may be turned off before providing to such a user, such that, when the user receives and/or turns on the mobile device 102, with the provisioning flag 118 set to the second state associated with the post-deployment update mode (e.g. "2"), when the mobile device 102 turns back on, the mobile device 102 may proceed to the view IV (e.g. with any further updates to the first communication system 110 occurring automatically, as described above), and waits until the electronic button 404 until proceeding to the second provisioning stage.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and provision a mobile device, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, at a mobile device, upon power-up, a status of a provisioning flag;
   in response to the provisioning flag comprising a first state associated with an out-of-box update mode, implementing, at the mobile device, a first provisioning stage associated with a first communication system according to the out-of-box update mode;
   in response to the provisioning flag comprising a second state associated with a post-deployment update mode, implementing, at the mobile device, the first provisioning stage associated with the first communication system according to the post-deployment update mode different from the out-of-box update mode; and
   implementing, at the mobile device, a second provisioning stage for one or more of a second communication system and an operating system implemented at the mobile device.

2. The method of claim 1, wherein, in the out-of-box update mode, user testing of the first communication system is provided as an option prior to implementing the second provisioning stage.

3. The method of claim 1, wherein, in the post-deployment update mode, implementing the second provisioning stage occurs following, or immediately following, the first provisioning stage, without user testing.

4. The method of claim 1, wherein the first communication system comprises one or more of a land mobile radio (LMR) communication system and a narrowband communication system.

5. The method of claim 1, wherein the second communication system comprises one or more of a Long-Term Evolution (LTE) communication system and a broadband communication system.

6. The method of claim 1, further comprising, upon power-up, retrieving the provisioning flag from a provisioning server.

7. The method of claim 1, further comprising:
   upon power-up, communicating with a provisioning server to determine whether an update for the first communication system is available;
   in response to determining that the update for the first communication system is available, implementing the out-of-box update mode or the post-deployment update mode according to the provisioning flag; and
   in response to determining that the update for the first communication system is not available, implementing the second provisioning stage without implementing the first provisioning stage.

8. The method of claim 1, wherein, in the second provisioning stage, options are provided for setting up user options for one or more of the second communication system and the operating system.

9. The method of claim 1, further comprising:
   prior to implementing the second provisioning stage, determining whether the second provisioning stage was previously implemented;
   in response to determining that the second provisioning stage was not previously implemented, implementing the second provisioning stage; and
   in response to determining that the second provisioning stage was previously implemented, skipping implementing the second provisioning stage, other than to install available network updates for the operating system.

10. The method of claim 1, further comprising:
    in response to completing the first provisioning stage in the out-of-box update mode, changing the provisioning flag, as stored at a memory of the mobile device, from the first state to the second state; and
    in response to a factory reset being performed at the mobile device, changing the provisioning flag, as stored at the memory of the mobile device, from the second state to the first state, such that the first provisioning stage is again implemented in the out-of-box update mode after a next power-up of the mobile device.

11. A mobile device comprising:
    a communication unit;
    a first communication system;
    a second communication system; and
    a controller communicatively coupled to the communication unit, the first communication system, and the second communication system, the controller configured to:

determine, upon power-up, a status of a provisioning flag;

in response to the provisioning flag comprising a first state associated with an out-of-box update mode, implement a first provisioning stage associated with the first communication system according to the out-of-box update mode;

in response to the provisioning flag comprising a second state associated with a post-deployment update mode, implement the first provisioning stage associated with the first communication system according to the post-deployment update mode different from the out-of-box update mode; and implement a second provisioning stage for one or more of the second communication system and an operating system implemented at the mobile device.

12. The mobile device of claim 11, wherein the controller is further configured to: in the out-of-box update mode, provide user testing of the first communication system as an option prior to implementing the second provisioning stage.

13. The mobile device of claim 11, wherein the controller is further configured to: in the post-deployment update mode, implement the second provisioning stage following, or immediately following, the first provisioning stage, without user testing.

14. The mobile device of claim 11, wherein the first communication system comprises one or more of a land mobile radio (LMR) communication system and a narrowband communication system.

15. The mobile device of claim 11, wherein the second communication system comprises one or more of a Long-Term Evolution (LTE) communication system and a broadband communication system.

16. The mobile device of claim 11, wherein the controller is further configured to: upon power-up, retrieve, via the communication unit, the provisioning flag from a provisioning server.

17. The mobile device of claim 11, wherein the controller is further configured to:

upon power-up, communicate, via the communication unit, with a provisioning server to determine whether an update for the first communication system is available;

in response to determining that the update for the first communication system is available, implement the out-of-box update mode or the post-deployment update mode according to the provisioning flag; and in response to determining that the update for the first communication system is not available, implement the second provisioning stage without implementing the first provisioning stage.

18. The mobile device of claim 11, wherein the controller is further configured to: in the second provisioning stage, provide options for setting up user options for one or more of the second communication system and the operating system.

19. The mobile device of claim 11, wherein the controller is further configured to:

prior to implementing the second provisioning stage, determine whether the second provisioning stage was previously implemented;

in response to determining that the second provisioning stage was not previously implemented, implement the second provisioning stage; and in response to determining that the second provisioning stage was previously implemented, skip implementing the second provisioning stage, other than to install available network updates for the operating system.

20. The mobile device of claim 11, further comprising a memory storing the provisioning flag in the first state or the second state, wherein the controller is further configured to:

when the provisioning flag is stored at the memory in the first state, in response to completing the first provisioning stage in the out-of-box update mode, change the provisioning flag, as stored at the memory, from the first state to the second state; and when the provisioning flag is stored at the memory in the second state, in response to a factory reset being performed at the mobile device, change the provisioning flag, as stored at the memory, from the second state to the first state, such that the first provisioning stage is again implemented in the out-of-box update mode after a next power-up of the mobile device.

* * * * *